(12) United States Patent
Jarok

(10) Patent No.: US 10,735,142 B2
(45) Date of Patent: Aug. 4, 2020

(54) MULTI-SYSTEM DATA TRANSFER PROTOCOL

(71) Applicant: Goodrich Corporation, Charlotte, NC (US)

(72) Inventor: Jonathan C. Jarok, Chelmsford, MA (US)

(73) Assignee: Goodrich Corporation, Charlotte, NC (US)

( * ) Notice: Subject to any disclaimer, the term of this patent is extended or adjusted under 35 U.S.C. 154(b) by 169 days.

(21) Appl. No.: 14/725,890

(22) Filed: May 29, 2015

(65) Prior Publication Data

US 2016/0352468 A1 Dec. 1, 2016

(51) Int. Cl.
| | | |
|---|---|---|
| *H04L 1/08* | (2006.01) | |
| *H04L 1/00* | (2006.01) | |
| *H04L 1/18* | (2006.01) | |
| *H04L 29/08* | (2006.01) | |
| *H04L 1/16* | (2006.01) | |
| *H04L 29/06* | (2006.01) | |

(52) U.S. Cl.
CPC .............. *H04L 1/08* (2013.01); *H04L 1/0079* (2013.01); *H04L 1/1642* (2013.01); *H04L 1/1838* (2013.01); *H04L 65/4069* (2013.01); *H04L 69/16* (2013.01); *H04L 69/324* (2013.01)

(58) Field of Classification Search
None
See application file for complete search history.

(56) References Cited

U.S. PATENT DOCUMENTS

| | | | | |
|---|---|---|---|---|
| 5,809,231 A | * | 9/1998 | Yokoyama | ........... H04N 19/895 348/416.1 |
| 8,327,233 B2 | | 12/2012 | Long et al. | |
| 8,375,277 B2 | | 2/2013 | Koster et al. | |

(Continued)

FOREIGN PATENT DOCUMENTS

| | | |
|---|---|---|
| EP | 0660579 | 6/1995 |
| EP | 1379051 | 1/2004 |

(Continued)

OTHER PUBLICATIONS

Extended European Search Report for European Patent Application No. 16001217.5, dated Oct. 31, 2016.

(Continued)

*Primary Examiner* — Jeffrey M Rutkowski
*Assistant Examiner* — Mehedi S Aley
(74) *Attorney, Agent, or Firm* — Locke Lord LLP; Scott D. Wofsy; Judy R. Naamat

(57) ABSTRACT

A computer system is provided for exchanging data with a second computer system using a one-way protocol. The computer system includes a communication port, a memory configured to store instructions, and a processor disposed in communication with the memory. The processor upon execution of the instructions is configured to receive via the communication port a plurality of data packets of a data transmission transmitted in accordance with a one-way protocol from the second computer system, the data transmission representing a data structure, each data packet having a header that indicates a data type of the data transmission, and determine if a data packet of the data transmission is missing based on the data type and the number of data packets received.

13 Claims, 4 Drawing Sheets

(56) References Cited

U.S. PATENT DOCUMENTS

| | | | |
|---|---|---|---|
| 8,942,236 B1 | 1/2015 | Vincent et al. | |
| 2002/0126629 A1* | 9/2002 | Jiang | H04W 12/001 370/328 |
| 2003/0193950 A1 | 10/2003 | Philips et al. | |
| 2004/0010595 A1* | 1/2004 | Hiranaka | H04L 1/1809 709/227 |
| 2004/0073582 A1* | 4/2004 | Spiegel | G06F 3/0619 |
| 2005/0068951 A1 | 3/2005 | Rivard et al. | |
| 2007/0091810 A1* | 4/2007 | Kim | H04L 1/1635 370/236 |
| 2009/0086760 A1* | 4/2009 | Vedantham | H04L 1/1628 370/474 |
| 2012/0300663 A1* | 11/2012 | Lu | H04L 1/1671 370/252 |
| 2013/0042174 A1* | 2/2013 | Basso | G06Q 10/101 715/255 |
| 2014/0192824 A1* | 7/2014 | Lee | H04L 1/007 370/474 |
| 2015/0009999 A1* | 1/2015 | Oguchi | H04L 69/169 370/392 |
| 2015/0244761 A1* | 8/2015 | Tsyganok | G06F 11/08 709/219 |
| 2017/0331713 A1* | 11/2017 | Skarve | H04L 43/0829 |

FOREIGN PATENT DOCUMENTS

| | | |
|---|---|---|
| EP | 2001180 | 12/2008 |
| WO | WO-2013098812 A1 | 7/2013 |

OTHER PUBLICATIONS

Communication Pursuant to Article 94(3) EPC, for European Patent Application No. 16001217.5, dated Oct. 4, 2017.

Communication pursuant to Article 94(3) EPC for European Patent Application No. 16001217.5, dated Jun. 15, 2018.

\* cited by examiner

MULTI-SYSTEM DATA TRANSFER PROTOCOL

FIELD OF THE INVENTION

The disclosed embodiments generally relate to a data transfer protocol, and more particularly, to a data transfer protocol for a one-way protocol that enables packet loss detection.

BACKGROUND OF THE INVENTION

Known methods for transferring data between computing devices include establishing communication with handshaking and monitoring the quality of the data transfer, such as for lost data. These methods use two-way protocols in which messages for implementing the protocol are exchanged in two directions between the computing devices. Two-way protocols use significant processing power, and are not appropriate for certain devices that transfer data, such as sensors. Additionally, in some circumstances, a sensor may be deployed on an aircraft, spacecraft, watercraft, or in a remote or harsh location. Two-way communication may be or become impossible, impracticable, or impractical.

Known methods for transferring data between computing devices using a one-way protocol include using user datagram protocol (UDP) and UDP-based data transfer protocol (UDT). These protocols do not include a way for detecting missed data packets or datagrams or reconstructing missed data packets. Rather, the loss of data packets has been tolerated, or considered to be relatively inconsequential for certain applications, such as certain applications that use voice data transmission. However, in certain applications, undetected data packet loss is not desirable or tolerable.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a computer system for exchanging data with a second computer system using a one-way protocol is described. The computer system includes a communication port, a memory configured to store instructions, and a processor disposed in communication with the memory. The processor upon execution of the instructions is configured to receive via the communication port a plurality of data packets of a data transmission transmitted in accordance with a one-way protocol from the second computer system, and determine if a data packet of the data transmission is missing based on the data type and the number of data packets received. The data transmission represents a data structure, and each data packet has a header that indicates a data type of the data transmission.

In embodiments, if a data packet is determined to be missing, the processor upon execution of the instructions can further be configured to transmit a request to the second computer system for retransmission of the data packet that is determined to be missing. Each data packet header can further indicate a position of data within the data structure that the data packet represents. The processor upon execution of the instructions can further be configured to determine a position of data within the data structure that a data packet determined to be missing represents based on the position of data indicated by the headers of the received data packets.

In an embodiment, each data packet can further include payload data that represents the data within the data structure at the position indicated by the position of data indicated in the header of the packet. The processor upon execution of the instructions can further be configured to determine an assembly of payload data of received data packets using the position of data indicated in the header associated with the respective received data packets and determine a location in the assembly that corresponds to missing payload data due to one of the data packets determined to be missing. The location can be determined based on the position of data within the data structure that corresponds to the data packet determined to be missing relative to the positions of data within the data structure that correspond to the payload data included in the assembly. The processor upon execution of the instructions can further be configured to reconstruct the missing payload data using the location in the assembly determined to correspond to the missing data packet, the payload data included in the assembly, and the position of data indicated by the headers associated with the payload data included in the assembly.

In embodiments, the header of each packet can further indicate a position of the packet in the data transmission, wherein the position of the packet in the data transmission can be a start packet indicating the beginning of the data transmission, an end packet indicating the end of the data transmission, or a middle packet indicating the middle of the data transmission. The processor upon execution of the instructions can further be configured to determine whether a data packet of the data transmission is missing based on the position of the packet in the data transmission indicated.

In embodiments, the header associated with the data packet can include the total number of bytes in the data packet. The processor upon execution of the instructions can further be configured to determine whether a data packet is missing based on the total number of bytes included in the header, wherein if the number of bytes in a data packet that was received does not equal the total number of bytes in the data packet's header, the data packet can be determined to be missing based on corruption.

In embodiments, the data type associated with the data structure can be one of image data, textual data, numeric data, audio data, and video data. The one-way protocol can be user datagram protocol (UDP). In embodiments, the one-way protocol can be UDP-based data transfer protocol (UDT).

In further, optional aspects, a method for exchanging data with a second computer system using a one-way protocol is described. The method includes receiving a plurality of data packets of a data transmission transmitted in accordance with a one-way protocol from the second computer system. The data transmission represents a data structure, and each data packet has a header that indicates a data type of the data transmission. The method further includes determining if a data packet of the data transmission is missing based on the data type and the number of data packets received.

In embodiments, if a data packet is determined to be missing, the method can further include transmitting a request to the second computer system for retransmission of the missing packet. Each data packet header can further indicate a position of data within the data structure that the data packet represents. The method can further include determining a position of data within the data structure that a data packet determined to be missing represents based on the position of data indicated by the headers of the received data packets.

In embodiments, each data packet can further include payload data that represents the data within the data structure at the position indicated by the position of data indicated in the header of the packet. The method can further include determining an assembly of payload data of received data packets using the position of data indicated in the header associated with the respective received data packets and determining a location in the assembly that corresponds to missing payload data due to one of the data packets determined to be missing. The location can be determined based on the position of data within the data structure that corresponds to the data packet determined to be missing relative to the positions of data within the data structure that correspond to the payload data included in the assembly. The method can further include reconstructing the missing payload data using the location in the assembly determined to correspond to the missing data packet, the payload data included in the assembly, and the position of data indicated by the headers associated with the payload data included in the assembly.

In embodiments, the header of each packet can further indicate a position of the packet in the data transmission that indicates whether the data packet is a start packet indicating the beginning of the data transmission, an end packet indicating the end of the data transmission, or a middle packet indicating the middle of the data transmission. The method can further include determining whether a data packet of the data transmission is missing based on an indication of a position of the packet in the data transmission. In embodiments the one-way protocol can be UDP.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
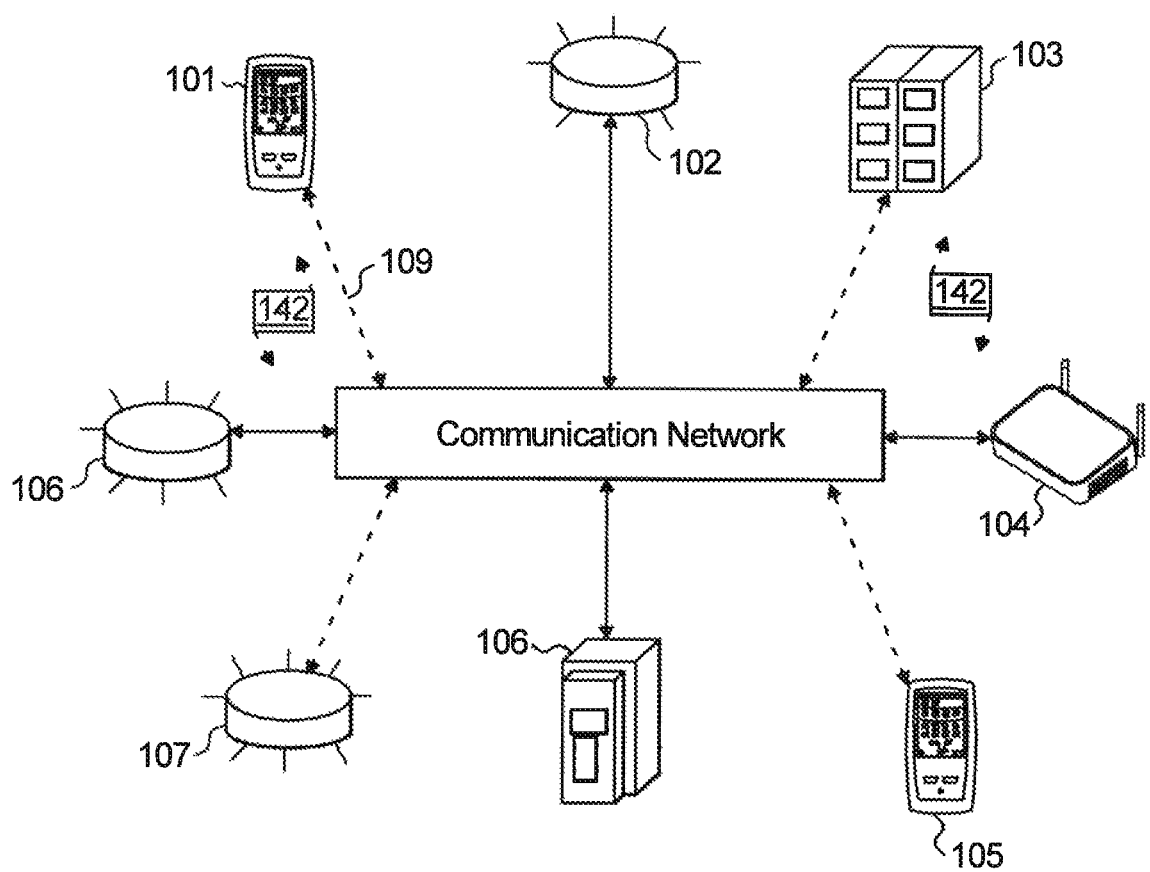
FIG. 1 illustrates an example communication network of the disclosure.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding either both of those included limits are also included in the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety.

It is to be understood a communication network 100 is a geographically distributed collection of nodes interconnected by communication links and segments for transporting data between end nodes, such as a sensor disposed on an airplane, satellite, watercraft, animal, remote land borne location and a sophisticated computing device, such as a personal computer, work station, smart phone device, tables, or mini, micro, or mainframe computer. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In an embodiment, the user's computer and the remote computer can communicate via a point-to-point or peer-to-peer network.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
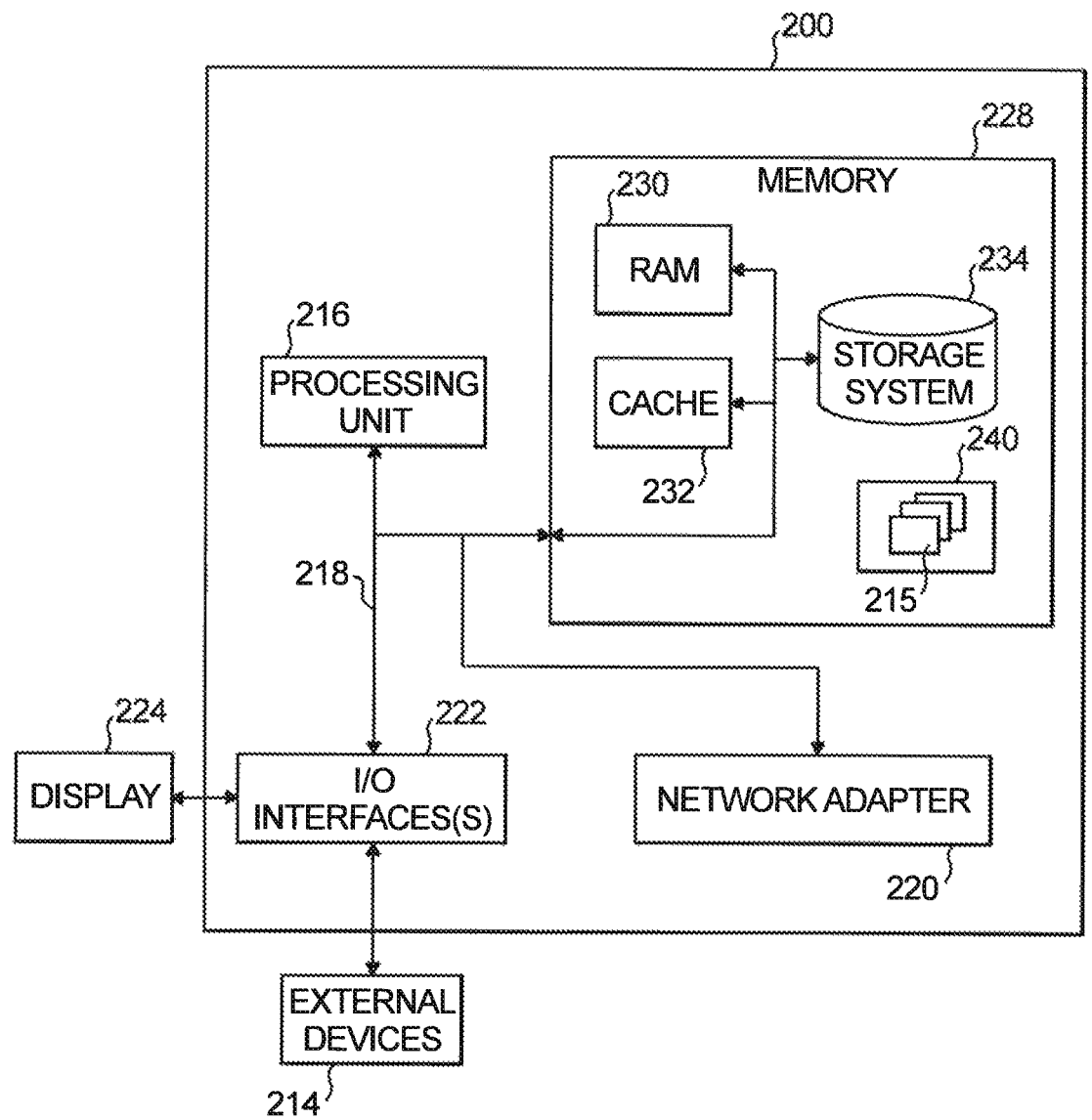
FIG. 2 illustrates an example network device/node of the disclosure.

FIG. 2 is a schematic block diagram of an example network computing device 200 (e.g., sensor 102, client computing device 103, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

It is to be understood that device 200 can be a simplified computing device, such as sensor 102 that includes a sensing device, processing unit 216 such as a microcontroller, system memory 228 such as a storage device to store sensing data output by the sensing data, and a network adaptor 220 and communication port, such as a media access controller and/or Ethernet, wireless, or fiber optic port, or the like.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
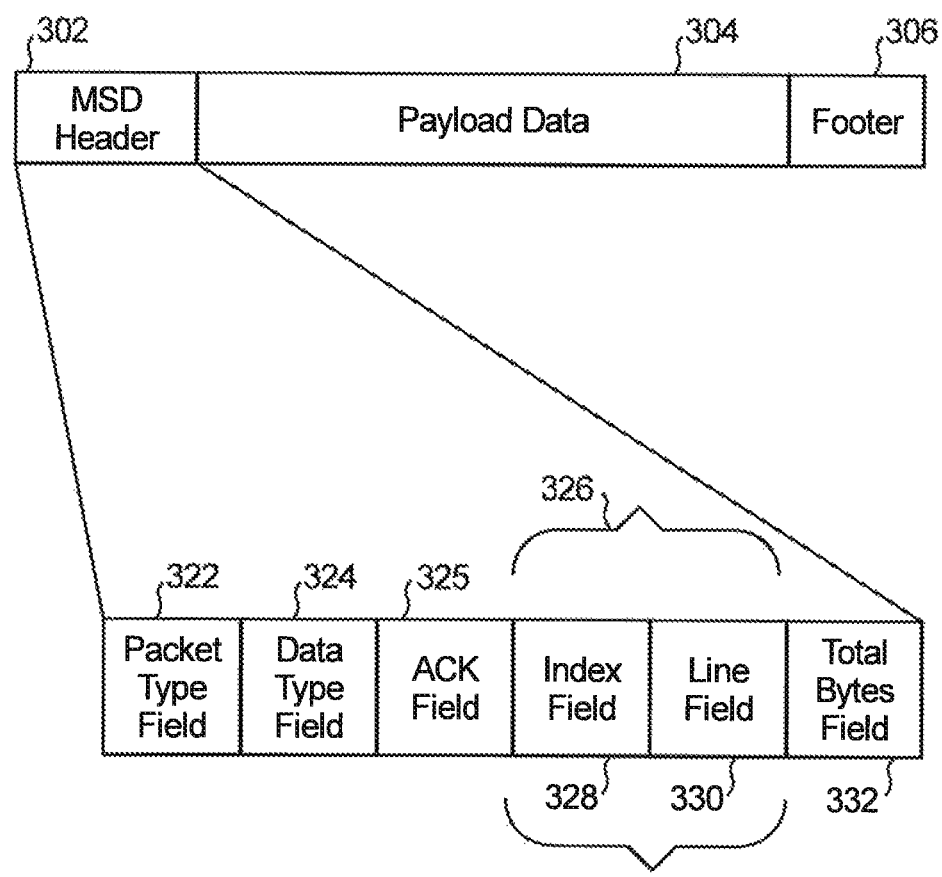
FIG. 3 illustrates an example data packet, with a header of the data packet showed in greater detail, in accordance with the disclosure.

With the exemplary communication network 100 (FIG. 1) and computing device 200 (FIG. 2) being generally shown and discussed above, description of certain illustrated embodiments of the present invention will now be provided. With reference now to FIG. 3, a data packet 300 is shown that includes a multi-system data (MSD) header 302 and payload data 304, with the header 302 shown in greater detail. The packet can optionally include a packet footer 306. The data packet 300 is included in a data transmission that includes a plurality of data packets. The plurality of data packets 300 represent a data structure. Each payload data 304 in the data transmission includes a portion of data included in the data structure that is associated with a location of the data structure. The entire data structure can be included in the payload data of the plurality of data packets 300 of the data transmission. Accordingly, the payload data 304 in the data packets of the data transmission form the entire data structure when assembled together. Examples of a data structure that may be transmitted by a data transmission include a data file that includes an image, textual data, numeric data, a video frame, audio data, or a combination thereof.

The data transmission is sent using a one-way protocol that does not use handshaking. Examples of one-way protocols, without limitation, include user datagram protocol (UDP) and UDP-based data transfer protocol (UDT). Traditionally, one-way protocols do not include structure and/or functionality for a computing device (e.g., any of nodes/devices 101-108) that is receiving a data transmission from another computing device (e.g., any of nodes/devices 101-108) to detect a packet that was lost at the software level, or to recover such a lost packet.

An MSD transfer protocol that uses the MSD header 302 provides the ability to detect a missing data packet 300 that was lost, e.g., at the software level or disappeared at the wireless level. The MSD header 302 includes a packet type field 322, a data type field 324, an acknowledge field 325, and one or more position data fields 326 that include, for example, an index field 320 and a line field 330, and a total bytes field 332. Some fields of the MSD header 302 can be unused.

The packet type field 322 stores a packet type that indicates the type of packet being sent, such as which portion of the data transmission the data packet belongs to. For example, the packet type may indicate that the data packet is the first data packet of the data transmission (e.g., a start frame), the last data packet of the data transmission (e.g., an end frame), or belongs to the middle data packets of the data transmission (e.g., frame).

The data type field 324 stores a data type that indicates the type of data that is being transmitted by the data transmission. The type of data can identify a specific type of image file, data file, audio stream etc. The type of data can be used to route the data and/or reconstruct an original media. For example, the type of data can indicate that the data structure was output by a sensor, identify the sensor that transmitted the data, and indicate whether the data is provided in a text, numeric, image, video, or audio file, and the size of the file.

The acknowledge field (ACK) 325 indicates that the device that sent the packet (the sender) requests an acknowledgement packet that indicates to the sender that the packet was received.

The position data field 326 stores position data that indicates the position of data that the data packet represents within the data structure. For example, when the data structure is an image, the position data field can include an index field and a line field that indicate the index and line of the image to which the payload data corresponds. The index field 328 indicates each packet index of multiple packet indexes per line when there are multiple packets per line. The line field indicates a line of data in the data structure, such as a line of data in an image. In certain data structures that are files, a file can be arbitrarily divided into packets. When transferring such a file, the index field is not used.

The total bytes field indicates the number of bytes in the MSD header. The receiving computing device can calculate the number of bytes received in the MSD header. If the number of bytes received is different than the number of bytes indicated in the total bytes field 332, the receiving computing device may conclude that the associated data packet is corrupted, and treat it as a missing data packet.

Figure 4:
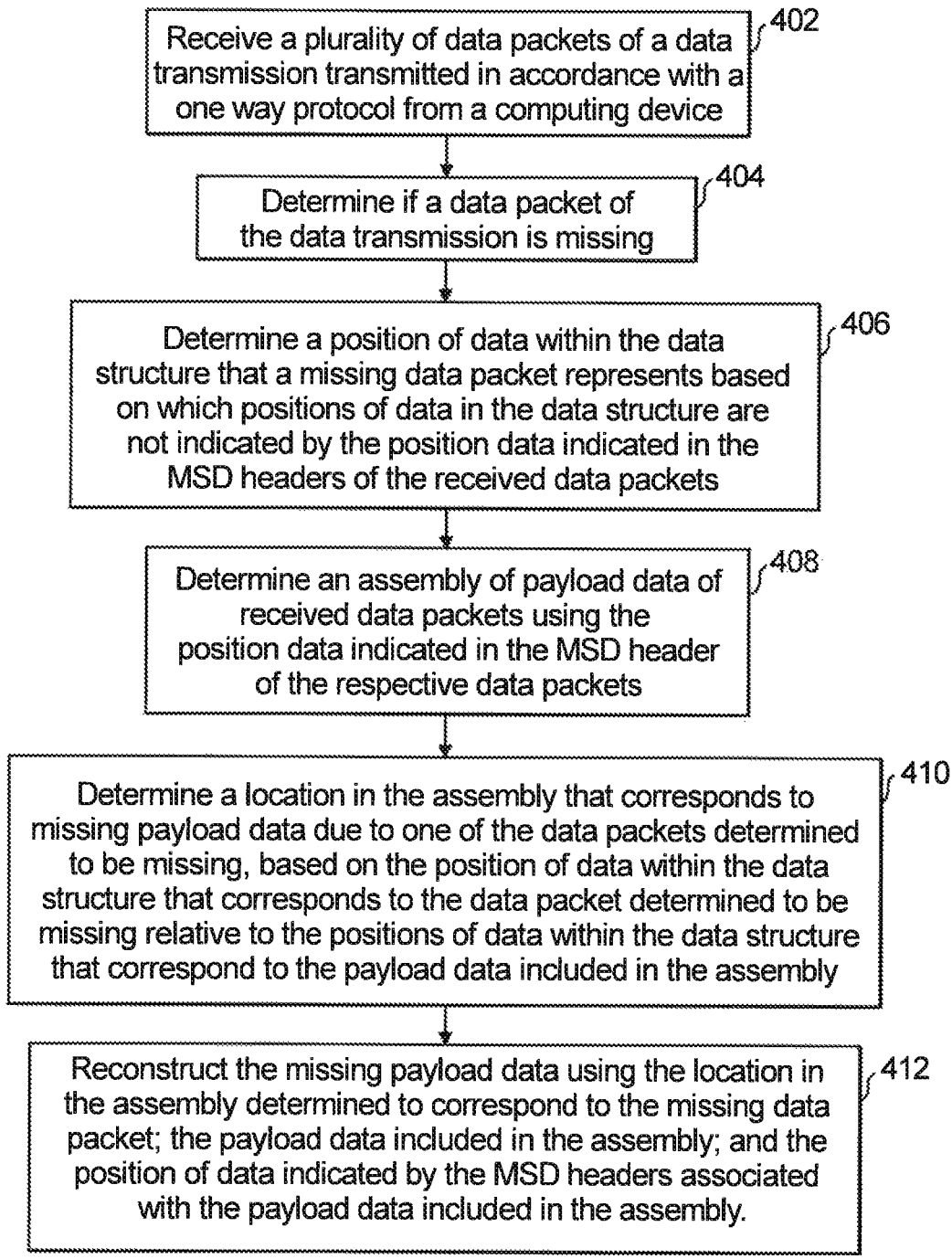
FIG. 4 illustrates a method of detecting a missing packet and reconstructing data associated with the missing packet in accordance with the disclosure.

With reference now to FIG. 4, shown is a flowchart demonstrating implementation of the various exemplary embodiments. It is noted that the order of operations shown in FIG. 4 is not required, so in principle, the various operations may be performed out of the illustrated order. Also certain operations may be skipped, different operations may be added or substituted, or selected operations or groups of operations may be performed in a separate application following the embodiments described herein.

At operation 402 a computing device receives a plurality of data packets of a data transmission that was transmitted by a transmitting computing device. The transmitting computing device can be, for example, a node or device such as nodes/devices 101-108 shown in FIG. 1. Accordingly, the transmitting computing device can be a sensor that transmits information output in response to sensing. The sensor can include, for example, a camera or a microphone that outputs image, audio and/or video data. In embodiments, the sensor can sense physical conditions, for example, temperature, motion, pressure, location, vibration, chemical properties, light, or radiation, without limitation.

The data transmission can be transmitted in accordance with a one-way protocol from a transmitting computer system. In embodiments, the transmitting computing device can operate in one-way and/or two-way communication modes. In the one-way mode, the transmitting computing system can transmit data, but cannot receive data. In the two-way communication mode, the transmitting computing system can transmit and receive data. In embodiments, the ability to receive data can be limited to receiving certain types of messages, such as a request to resend a data packet.

At operation 404, the receiving computing device determines if a data packet of the data transmission is missing. In embodiments, the determination of whether a data packet is missing can be based, at least partially, on the type of data indicated in the data type stored by the data type field 324 and/or on the number of data packets received. Typically, although not guaranteed, UDP packets arrive at their destination in a particular order (not guaranteed), such as defined by the line field 330 and/or index field 328.

When a counter is provided within the MSD header, a missed packet can be detected and/or identified by using the counter and/or relying on the order. In an embodiment, the method includes waiting until an end packet is received before determining that a packet is missing or requesting a missed packet. In still another embodiment of the method, the number of packets in a frame that will be transmitted is included in the start packet to indicate the start of the frame. The device receiving the packets can count the packets received and determine if the number of packets received is less than the expected number of packets transmitted in the start packet, which would indicate that a packet is missing.

However, in a scenario in which the end packet that indicates the end of a frame is lost, additional logic and decision making is needed to determine how to handle this circumstance. In an embodiment, the end packet can include an acknowledge bit to request acknowledgement of receipt and to ensure that the end packet has been received.

In embodiments, the determination of whether a data packet is missing can be based, at least partially, on the type of packet indicated in the packet type stored by the packet type field 322. The packet type stored in the packet type field 322 can have the same number (e.g., a hexadecimal number) for each middle packet. A missing middle packet would have this same packet type field. In embodiments, the determination of whether a data packet is missing can be based, at least partially, on the total number of bytes expected in the data packet as indicated by the data type stored by the data type field 324 and an actual total number of data bytes included in the data packet. If the number of bytes expected does not equal the actual number of bytes received, then the data packet may be corrupted and can be considered as if it were not received.

At operation 406, positions of data within the data structure are determined that corresponds to a missing data packet based on which positions of data in the data structure are not indicated by the position data stored in the position data fields 326 of the received data packets.

At operation 408, an assembly of payload data of received data packets is determined or formed using the position data stored in the position data fields 326 of the respective received data packets.

At operation 410, a location in the assembly that corresponds to missing payload data due to the missing data packets is determined. The location in the assembly determined for a missing data packet is based on the position of data within the data structure that corresponds to the missing data packet relative to the positions of data within the data structure that correspond to the payload data included in the assembly.

At operation 412, the missing payload data that corresponds to missing data locations in the assembly is reconstructed. The missing payload can be determined using the location in the assembly determined to correspond to the missing data packet, the payload data included in the assembly, and the position data stored in the position data fields 326 that is associated with the payload data included in the assembly. For example, the missing payload data can be determined by interpolating payload data in positions of the assembly that are adjacent to the location in the assembly that corresponds to the missing payload data.

In embodiments in which the transmitting computing device can operate in a two-way communication mode, the receiving computing device can transmit a signal to the transmitting computing device that identifies and requests the missing data packets. The request for the missing packet can include, for example, the packet type field 322 and the data type field 324 of the missing data packet, and one or more position data fields 326, e.g., the index field 328 and line field 330, that indicate which data packet is missing.

In embodiments, the receiving computing device can transmit an acknowledge request signal to the transmitting computing device, which requests that the receiving computing device transmit an acknowledgement packet to the sender. The acknowledgment can include, for example, the packet type field 322 and the data type field 324 of the data packet being acknowledged, and one or more position data fields 326, e.g., the index field 328 and line field 330, that indicate the position of the data packet being acknowledged.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A sensor for exchanging data with a computer system using a one-way protocol, comprising:
   a sensing device for sensing;
   a communication port;
   a memory configured to store instructions; and
   a processor disposed in communication with said memory, wherein said processor upon execution of the instructions is configured to:
   transmit, in response to the sensing, via the communication port, a plurality of data packets of a data transmission transmitted in accordance with a one-way protocol to the computer system, the data transmission representing a data structure, each data packet having a header that indicates a data type of the data transmission, wherein each data packet header further includes position data that indicates a position of payload data within the data structure that the data packet represents, the position data including a line field that indicates a line data in the data structure and an index field that indicates a packet index of multiple packet indexes per line,
   wherein the data transmission is configured to indicate when a data packet is missing based on the data type and the number of data packets transmitted in the data transmission, and
   wherein the data transmission is further configured to indicate positions of data within the data structure that correspond to each data packet indicated to be missing represents positions of data within the data structure that are not indicated by the line field and index field in the headers of the position data of the transmitted data packets.

2. The computer system according to claim 1, wherein the communication port is configured to resend a missing data packet in response to a request from the computer system that was determined to be missing.

3. The computer system according to claim 1, wherein each data packet further includes payload data that represents the data within the data structure at the position indicated by the position of data indicated in the header of the packet, wherein:
   the payload data of the data transmission is configured to be assembled into an assembly using the position of data indicated in the header associated with the respective received data packets, the data transmission is further configured to indicate a location in the assembly that corresponds to missing payload data due to one of the data packets indicated to be missing, the location being indicated based on the position of data within the data structure that corresponds to the data packet indicated to be missing relative to the positions of data within the data structure that correspond to the payload data included in the assembly, and
   the data transmission is further configured for reconstruction of the missing payload data using the location in the assembly indicated to correspond to the missing data packet, the payload data included in the assembly, and the position of data indicated by the headers associated with the payload data included in the assembly.

4. The computer system according to claim 1, wherein the header of each packet further indicates a position of the packet in the data transmission, the position of the packet in the data transmission being a start packet indicating the beginning of the data transmission, an end packet indicating the end of the data transmission, or a middle packet indicating the middle of the data transmission, and the data transmission is further configured to indicate whether a data packet of the data transmission is missing based on the position of the packet in the data transmission indicated.

5. The computer system according to claim 1, wherein the header associated with the data packet includes the total number of bytes in the data packet, and the data transmission is further configured to indicate whether a data packet is missing based on the total number of bytes included in the header, wherein if the number of bytes in a data packet that was received does not equal the total number of bytes in the data packet's header, the data packet is indicated to be missing based on corruption.

6. The computer system according to claim 1, wherein the data type associated with the data structure is one of image data, textual data, numeric data, audio data, and video data.

7. The computer system according to claim 1, wherein the one-way protocol is user datagram protocol (UDP).

8. The computer system according to claim 1, wherein the one-way protocol is UDP-based data transfer protocol (UDT).

9. A method for exchanging data with a second computer system using a one-way protocol, comprising:
Sensing by a sensing device;
transmitting, in response to the sensing, a plurality of data packets of a data transmission transmitted in accordance with a one-way protocol to the computer system, the data transmission representing a data structure, each data packet having a header that indicates a data type of the data transmission, wherein each data packet header further includes position data that indicates a position of payload data within the data structure that the data packet represents, the position data including a line field that indicates a line data in the data structure and an index field that indicates a packet index of multiple packet indexes per line;
wherein the data transmission is configured to indicate when a data packet of the data transmission is missing based on the data type and the number of data packets transmitted in the data transmission, and
wherein the data transmission is further configured to indicate positions of data within the data structure that correspond to each data packet indicated to be missing represents based on the positions of data within the data structure that are not indicated by the line field and index field in the headers of the position data of the transmitted data packets.

10. The method according to claim 9, wherein if a data packet is indicated to be missing, the method further comprises receiving a request from the computer system for retransmission of the missing packet.

11. The method according to claim 9, wherein each data packet further includes payload data that represents the data within the data structure at the position indicated by the position of data indicated in the header of the packet, and the method further includes:
indicating an assembly of payload data of received data packets using the position of data indicated in the header associated with the respective received data packets;
indicating a location in the assembly that corresponds to missing payload data due to one of the data packets indicated to be missing, the location being indicated based on the position of data within the data structure that corresponds to the data packet indicated to be missing relative to the positions of data within the data structure that correspond to the payload data included in the assembly; and
indicating reconstruction of the missing payload data using the location in the assembly indicated to correspond to the missing data packet, the payload data included in the assembly, and the position of data indicated by the headers associated with the payload data included in the assembly.

12. The method according to claim 9, wherein the header of each packet further indicates a position of the packet in the data transmission that indicates whether the data packet is a start packet indicating the beginning of the data transmission, an end packet indicating the end of the data transmission, or a middle packet indicating the middle of the data transmission, and the method further includes indicating whether a data packet of the data transmission is missing based on an indication of a position of the packet in the data transmission.

13. The method according to claim 9, wherein the one-way protocol is user datagram protocol (UDP).

* * * * *